United States Patent
Yin et al.

(10) Patent No.: US 6,980,574 B1
(45) Date of Patent: Dec. 27, 2005

(54) SHORT PULSE SEPARATION LASER

(75) Inventors: Yusong Yin, Stonybrook, NY (US);
Samuil Karlsbrun, Oakdale, NY (US)

(73) Assignee: Photonics Industries Int'l, Bohemia, NY (US)

( * ) Notice: Subject to any disclaimer, the term of this patent is extended or adjusted under 35 U.S.C. 154(b) by 306 days.

(21) Appl. No.: 10/623,086

(22) Filed: Jul. 18, 2003

(51) Int. Cl.$^7$ ............................................. H01S 3/10
(52) U.S. Cl. ......................................... 372/26; 372/25
(58) Field of Search ..................... 372/10–20, 26–28, 372/22, 106, 99; 359/329

(56) References Cited

U.S. PATENT DOCUMENTS

| | | | | |
|---|---|---|---|---|
| 5,197,074 A | * | 3/1993 | Emmons et al. | 372/26 |
| 5,339,323 A | * | 8/1994 | Hunter et al. | 372/25 |
| 6,108,356 A | * | 8/2000 | Yin | 372/22 |
| 6,580,732 B1 | * | 6/2003 | Guch et al. | 372/18 |

* cited by examiner

Primary Examiner—Minsun Oh Harvey
Assistant Examiner—Tuan N. Nguyen
(74) Attorney, Agent, or Firm—James A. Quinton

(57) ABSTRACT

According to the invention, a laser and a method of operating a laser which can produce multiple pulses from a single laser head is provided. A lasing medium is pumped by pumping source such as laser diodes, lamp and such. A modulator located in the cavity is turned on to induce a loss in the laser cavity sufficient to prevent lasing. A first predetermined amount of energy is stored in the lasing medium while the modulator is turned on due to a creation of a population inversion in the lasing medium in excess of the lasing threshold. The modulator is then turned off for a period of time to allow the lasing medium to provide a first pulse. The modulator is then turned on before the population inversion in the laser medium is depleted completely so that a predetermined amount of energy remains stored in the lasing medium. After the first pulse, the modulator again induces a loss in the cavity sufficient to prevent lasing. The modulator is maintained in the on position for a period of time to increase the amount of energy stored in the lasing medium. The modulator is then turned off for a third period of time to allow the lasing medium to produce a second pulse having a second controlled amount of pulse energy.

54 Claims, 7 Drawing Sheets

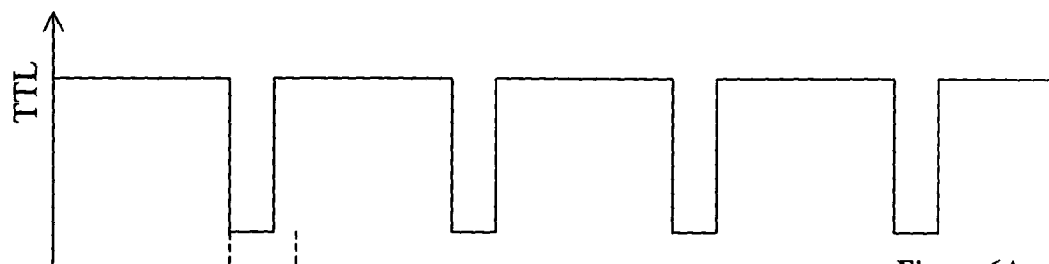
Figure 6A
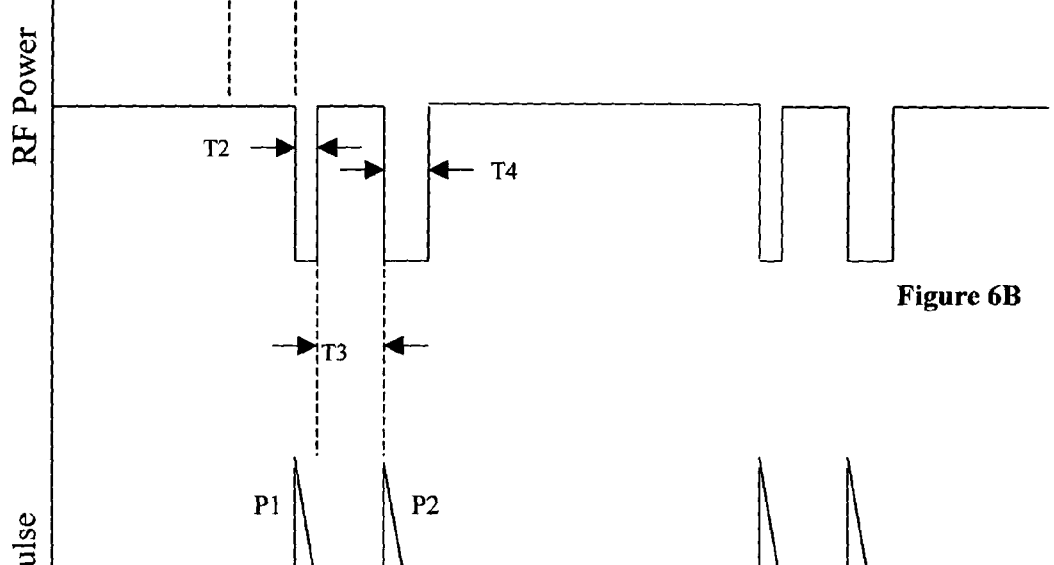
Figure 6B
Figure 6C
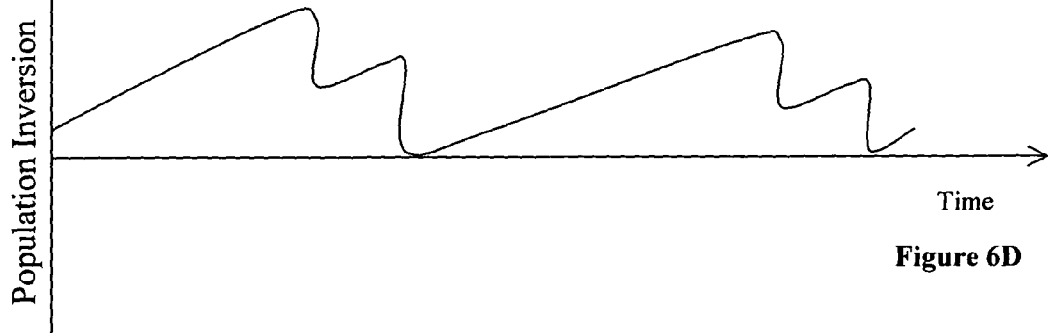
Time
Figure 6D

SHORT PULSE SEPARATION LASER

BACKGROUND OF THE INVENTION

1. Field of the Invention

The invention relates lasers that supply two or more pulses having short pulse separation and variable pulse energy among pulses.

2. Background of the Invention

Q-switched lasers are well known in the art. A Q-switch prevents lasing in a lasing medium by creating a loss in the cavity while pumping the lasing medium until a large population inversion in excess of the lasing threshold occurs. The Q-switch is then turned off and a large pulse which depletes the stored energy is obtained. When operating a Q-switched device, the time between pulses is generally at least the time required to pump the lasing medium to a sufficient population inversion to obtain a desired pulse energy when the stored energy is released by shutting off the Q-switch. Some applications require shorter pulse separation than the recovery time. Prior art devices have addressed this problem by using dual head lasers such as the Solo-PIV supplied by New Wave Research.

Efforts have been made to have variable Q-Switch operation. For example, U.S. Pat. No. 5,197,074 (Emmons) discloses a laser that it is capable of generating a laser output having preserved mode quality, waste position and output divergence as well as a selectable amplitude within a relative range of amplitudes and a selectable duration; U.S. Pat. No. 5,339,323 (Hunter) discloses the control of the laser pulse by a high loss time duration control signal supplied to a Q-switch.

There is still a need for devices which provide high energy pulses with a short pulse separation.

SUMMARY OF THE INVENTION

The invention provides a method and an apparatus for producing multiple pulses from a single head laser having a short pulse separation. The pulses have a controlled predetermined amount of pulse energy per pulse.

According to the invention, a method of operating a laser which can produce multiple pulses from a single laser head is provided. A pulsed pumped laser or a continuous pumped multiple pulse laser is provided. For a continuous pulsed laser, a laser cavity is formed. The laser cavity includes a lasing medium having a population inversion threshold for lasing and a modulator having an on and off position. The lasing medium is pumped by any convenient pump source such as a diode pumping source, lamp pump or other pumping sources. The modulator is turned on to induce a loss in the laser cavity sufficient to prevent lasing. A first predetermined amount of energy is stored in the lasing medium while the modulator is turned on due to a creation of a population inversion in excess of the lasing threshold of the lasing medium The modulator is then turned off for a first predetermined period of time to allow the lasing medium to provide a first pulse. The modulator is then turned on before the population inversion depletes completely in the laser medium so that a second predetermined amount of energy remains stored in the lasing medium.

The first pulse produced by the laser has a controlled amount of pulse energy which is dependent on the first predetermined time period that is how quickly the modulator is turned back on after it has been turned off to produce the first pulse. As a result, the lasing medium retains the second predetermined amount of energy by retaining a portion of the population inversion from the initial pumping of the lasing medium. After the first pulse, the modulator again induces a loss in the cavity sufficient to prevent lasing. The modulator is maintained in the on position for a second predetermined period of time while pumping continues to increase the amount of energy stored in the lasing medium to a third predetermined amount of energy by increasing the population inversion in the laser medium in excess of the population inversion remaining after the formation of the first laser pulse. The modulator is then turned off for a third predetermined period of time to allow the lasing medium to produce a second pulse having a second controlled amount of pulse energy. Desirably the pulse separation is two(2) times or less the fluorescent lifetime of the lasing medium. The process can be repeated to produce third, fourth, and fifth or more pulses depending on the amount of pulse energy required per pulse, the population inversion remaining in the lasing medium and pulse separation. When a pulsed pumped laser is used, depending on the pumping time and duration, there may be no increase in the amount of energy stored in the lasing medium after the first pulse is delivered.

In another aspect of the invention, a multiple pulse single head laser is provided. The laser according to the invention provides laser pulses with a short pulse separation between the pulses. The laser includes a laser cavity and a lasing medium having a population inversion threshold for lasing located within the cavity. A modulator which has an on and off position is located within the laser cavity in optical communication with the lasing medium.

A pumping source, desirably a diode pumping source is provided in optical communication with the lasing medium to provide electromagnetic radiation to the lasing medium. The modulator in the on position induces a loss in the cavity sufficient to prevent lasing. Desirably, the modulator is an acousto-optic or an electro-optic modulator. When the modulator is in the on position, energy is stored from the pumping source to create a population inversion in the lasing medium in excess of the lasing threshold, that is the amount required for the lasing medium to lase if the modulator was not creating a loss in the cavity. When the modulator is placed in the off position, the laser lases and produces a laser pulse. A controller, for example, an electronic control circuit, a CPU or other computer, is provided to turn the modulator from the on position to the off position and vise versa upon command. The controller turns the modulator on and off for preselected periods of time depending on the lasing medium, the pulse energy, pulse separation and number of pulses desired.

According to the invention, the modulator is turned on when the pumping source has been activated to create a loss in the cavity. Desirably, the modulator remains on for a sufficient period so that the lasing medium stores enough energy to provide the desired number of pulses having a preselected pulse energy. After the lasing medium has been pumped and a predetermined population inversion in excess of the lasing threshold has been achieved, the controller is programmed to then turn the modulator off for a first predetermined period of time to allow lasing of the laser medium to produce a first pulse. The modulator is then turned on again before the population inversion in the lasing medium is completely depleted. As a result, the amount of pulse energy in the first pulse is controlled to a predetermined amount. The controller maintains the modulator in the on position for a predetermined period of time which is the pulse separation while the laser medium is pumped. The controller is programmed to turn the modulator to the off position for a further predetermined period of time to allow the lasing medium to provide a second pulse having a controlled amount of pulse energy. Desirably, if there are only two pulses required, the modulator will be turned off until all the energy stored in the lasing medium is depleted in the second pulse. However, according to the invention, the amount of pulse energy in the first and second pulses can be controlled and if desired, the modulator often can be turned back on before all the population inversion in the lasing medium has been completely depleted. The controller can programmed to turn the modulator on and off for further periods of time to produce third, fourth, and fifth or more pulses depending on the amount of pulse energy required per pulse, the population inversion remaining in the lasing medium and pulse separation.

It is an object of the invention to provide a laser which can produce two or more pulses from a single head having a very short pulse separation while providing high pulse energy.

It is an object of the invention to provide a laser which produces 2 to 5 pulses from a single head having a very short pulse separation while providing high pulse energy.

It is an object of the invention to provide a single head laser which can produce multiple pulses having a pulse separation of two times or less than the fluorescent lifetime of the lasing material.

It is an object of the invention to provide a single head laser of which can produce multiple pulses having a pulse separation of the fluorescent lifetime or less of the lasing material.

It is an object of the invention to provide a single head laser which can produce multiple pulses having a pulse separation of 10% or less of the fluorescent lifetime of the lasing material.

It is an object of the invention to provide an Nd:YLF single head multiple pulse laser having a pulse separation of less than 10 $\mu$s.

Other and further objects will be apparent from the appended specification and drawings. It should be specifically understood that each embodiment of the invention will not necessarily achieve every object of the invention.

The preferred embodiment of the present invention is illustrated in the drawings and examples. However, it should be expressly, understood that the present invention should not be limited solely to the illustrative embodiment.

BRIEF DESCRIPTION OF THE DRAWINGS

FIG. 6 is a control flow chart for dual pulse operation.

DETAILED DESCRIPTION OF THE INVENTION

Figure 1:
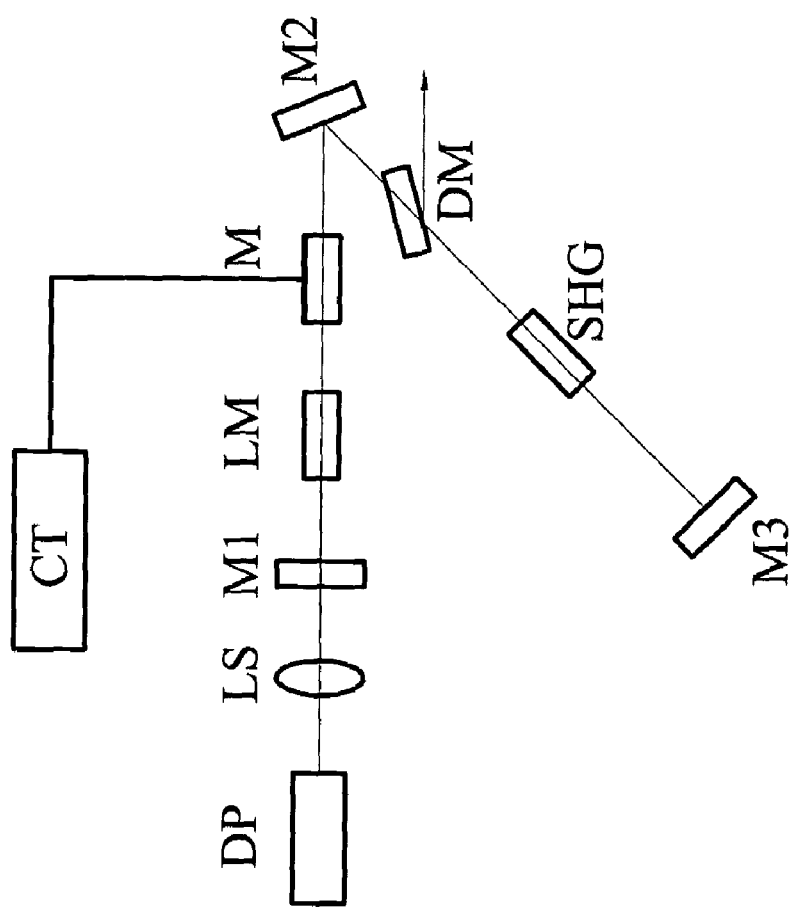
FIG. 1 is a schematic view of a laser according to the invention.

The invention provides a method and an apparatus for producing multiple pulses from a single head laser having a short pulse separation. The pulses have a controlled predetermined amount of pulse energy per pulse. Many applications for example particle image velocimetry(PIV) require two(2) or more pulses having very short pulse separation in the order of 1 $\mu$s to 500 $\mu$s and having relatively high pulse energy. Meeting this objective from a single laser head has been troublesome. Lasing medium in current use have a recovery time between Q-switched pulses longer than the required pulse separation. For example Nd:YLF lasing medium has a typical recovery time of about 100 $\mu$s, Nd:YAG of about 20 $\mu$s and Nd:YVO$_4$ of about 10 $\mu$s. Nd:YLF lasers generally can produce the highest pulse energy at a repetition rate in the order of 1000 pulse per second among Nd:YAG, Nd:YLF and Nd:YVO4 at similar pumping power, but have a longer recovery time. Nd:YVO$_4$ lasers have a quick recovery time but relatively low pulse energy at that repetition rate. Some applications require a second or further pulses with a pulse separation shorter than the recovery time of even Nd:YVO$_4$ Many application require a pulse energy of 1 to 10 mj or more from two pulses having a pulse separation of 1 $\mu$s to 500 $\mu$s. Prior art solutions have generally focused upon using multihead lasers. However there are numerous advantages to using a single head i.e. collinear output of the pulse sets plane of polarization and simpler design.

According to the invention, a method of operating a laser which can produce multiple pulses from a single laser head is provided. A laser cavity is formed. The laser cavity includes a lasing medium having a population inversion threshold for lasing. Desirably the lasing medium is desirably Nd:YLF, Nd:YAG, Nd:YVO$_4$, or Nd:GdVO$_4$ preferably Nd:YLF. A modulator preferably a Q-switch having an on and off position is located in the cavity. Desirably an acoustooptic or an electrooptic Q-switch preferably an acoustooptic Q-switch is located within the cavity, which when set in the on position induces a loss rate to prevent lasing of the laser within the cavity.

The lasing medium is pumped by any convenient pump source such as a diode pumping source, lamp pump, another laser or other pumping sources. The modulator is turned on to induce a loss in the laser cavity sufficient to prevent lasing. A first predetermined amount of energy is stored in the lasing medium while the modulator is turned on due to a creation of a population inversion in the lasing medium in excess of the lasing threshold of the lasing medium. The modulator is then turned off for a first predetermined period of time to allow the lasing medium to provide a first pulse. The modulator is then turned on while there is still a population inversion in the lasing medium preferably before the population inversion in the laser medium reaches the lasing threshold so that a second predetermined amount of energy remains stored in the lasing medium.

The first pulse produced by the laser has a controlled amount of pulse energy which is dependent on the first predetermined time period that is how quickly the modulator is turned back on after it has been turned off to produce the first pulse. As a result, the lasing medium retains the second predetermined amount of energy by retaining a portion of the population inversion preferably in excess of the lasing threshold. The modulator again induces a loss in the cavity sufficient to prevent lasing. The modulator is maintained in the on position for a second predetermined period of time which is approximately equal to the pulse separation while the pumping is continued to form a third predetermined amount of energy stored in the laser medium. The modulator is then turned off for a third predetermined period of time to allow the lasing medium to produce a second pulse having a second controlled amount of pulse energy. Desirably the pulse separation is two (2) times or less the fluorescent lifetime of the lasing medium preferably the fluorescent lifetime or less. Desirably a pulse separation of 10% of the fluorescent lifetime or less is provided. The fluorescent lifetime is a function of the time and probability that an electron will be maintained in an excited state in a lasing material. The greater the fluorescent lifetime the larger portion of a population inversion will be retained by the lasing medium at the same pumping power. At a 1% doping rate, the fluorescent lifetime of Nd:YLF is about 460 $\mu s$, Nd:YAG is about 230 $\mu s$ and Nd:YVO$_4$ is about 90 $\mu s$. Desirably, according to the invention, an Nd:YLF lasing medium preferably a Nd:YLF crystal rod is used. Desirably the pulse separation is about 0.5 $\mu sec$ to 500 $\mu sec$ preferably about 1 $\mu sec$ to about 300 $\mu sec$. The pulse energy for an Nd:YLF lasing medium can be 1 mj to 40 mj or more, desirably 3 to 25 mj per pulse for twin pulses.

The process can be repeated to produce third, fourth, and fifth or more pulses depending on the amount of pulse energy required per pulse, the population inversion remaining in the lasing medium and pulse separation. Desirably the process is repeated to produce 2 to 8 pulses as required by the application. Preferably the process of the invention produces two or three pulses having a short pulse separation and having about the same pulse energy per pulse. The modulation according to the invention is different than the typical Q-switch. Instead of an on/off operation where all the stored energy from pumping under Q conditions is released as a giant pulse, some of the population inversion is retained for further pulses having a short pulse separation.

In another aspect of the invention, a multiple pulse single head laser is provided. The laser according to the invention provides laser pulses with a short pulse separation between the pulses. The laser includes a laser cavity and a lasing medium having a population inversion threshold for lasing located within the cavity. A modulator which has an on and off position is located within the laser cavity in optical communication with the lasing medium. A pumping source, desirably a diode pumping source is provided in optical communication with the lasing medium to provide electromagnetic radiation to the lasing medium. The modulator in the on position induces a loss in the cavity sufficient to prevent lasing. Desirably, the modulator is an acoustooptic or an electrooptic modulator. When the modulator is in the on position, energy is stored from the pumping source to create a population inversion in the lasing medium in excess of the lasing threshold, that is the amount required for the lasing medium to lase if the modulator was not creating a loss in the cavity. When the modulator is placed in the off position, the lasing medium lases and an energy pulse is produced by laser. A controller, for example, an electronic control circuit, a CPU other computer, is provided to turn the modulator from the on position to the off position and vise versa. The controller turns the modulator on and off for preselected periods of time depending on the lasing medium, the pulse energy, pulse separation and number of pulses desired.

According to the invention, the modulator is turned on when the pumping source has been activated to create a loss in the cavity. Desirably, the modulator remains on a sufficient period so that the lasing medium stores enough energy to provide the desired number of pulses and pulse energy. After the lasing medium has been pumped and a predetermined population inversion in excess of the lasing threshold has been achieved, the controller turns the modulator off for a first predetermined period of time to allow lasing of the laser medium to produce a first pulse. The modulator is then turned on again before the stored energy is completely depleted preferably before the population inversion in the lasing medium falls below the lasing threshold.

As a result, the amount of pulse energy in the first pulse is controlled to a predetermined amount. The controller maintains the modulator in the on position for a predetermined period of time or pulse separation time to increase the amount of energy stored in the lasing medium to achieve a predetermined amount of energy by increasing the population inversion in the lasing medium. The controller turns the modulator to the off position for a further predetermined period of time to allow the lasing medium to provide a second pulse having a controlled amount of pulse energy. Desirably, if there is only two pulses required, the modulator will be turned off until all the energy stored in the lasing medium is expelled in the second pulse. However, according to the invention, the amount of pulse energy in the first and second pulses can be controlled and if desired, the modulator can be turned back on before all the population inversion in the lasing medium has been completely expended. The controller turns the modulator on and off for further period of time to produce third, fourth, and fifth or more pulses depending on the amount of pulse energy required per pulse, the population inversion remaining in the lasing medium and pulse separation. Desirably the controller turns the modulator on and off to produce 2 to 8 pulses as required by the application. Preferably the apparatus of the invention produces two or three pulses having a short pulse separation and having about the same pulse energy per pulse.

In an other aspect of the invention, harmonic lasers are provided which can deliver two (2) or more pulses having short pulse separation and high pulse energy. Desirably the lasing cavity is a harmonic cavity for example a second, third or fourth harmonic cavity for intracavity harmonic generation, preferably second harmonic or third harmonic. Optionally external harmonic generation can be employed by directing the pulsed output of the laser of the invention through an externally located harmonic generator for example a second harmonic generator. Optionally a fourth harmonic pulsed beam preferably a UV beam can be provided by utilizing an intracavity second harmonic cavity which is externally doubled to provide a fourth harmonic beam.

Figure 4:
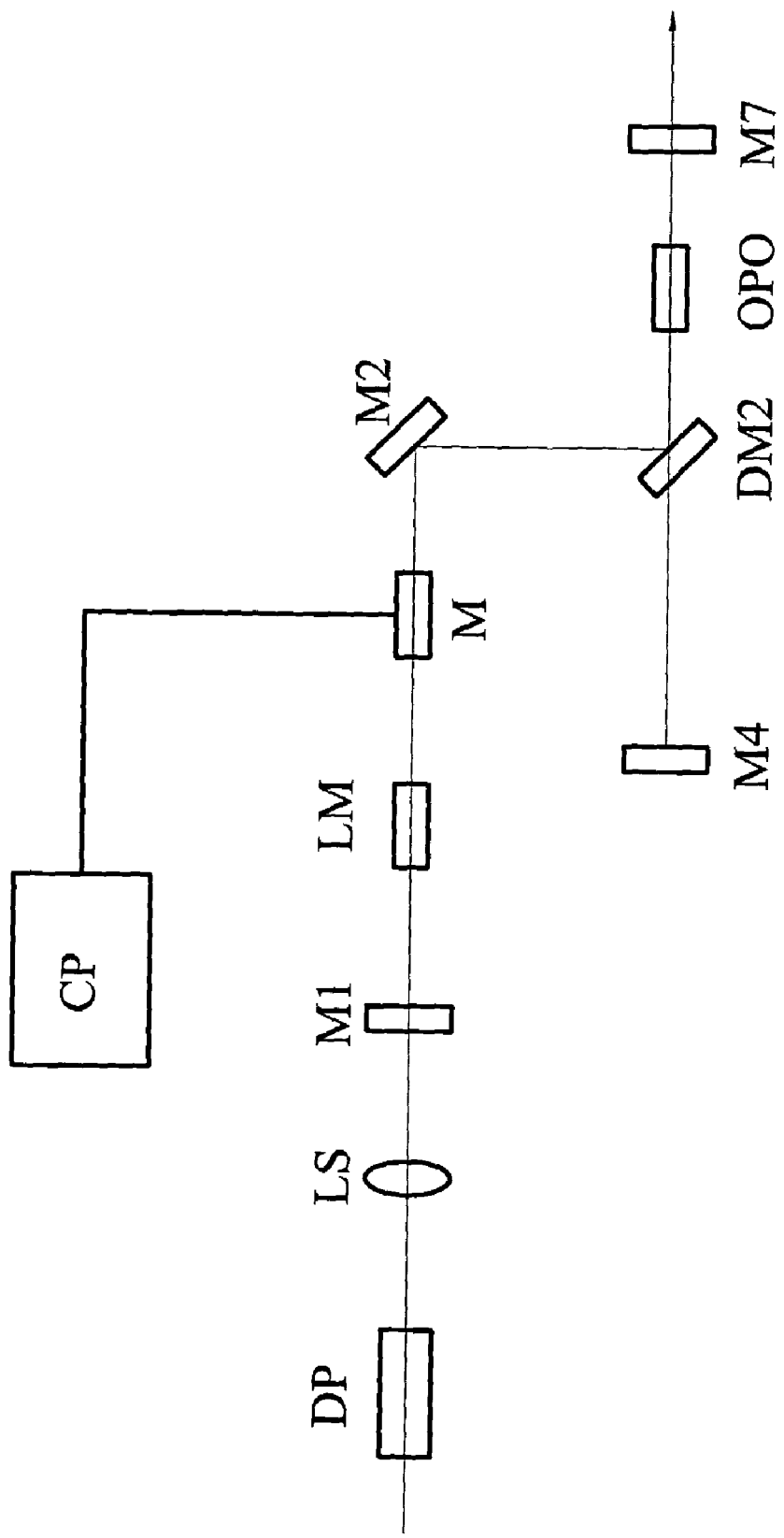
FIG. 4 is a schematic view showing an alternative embodiment of the laser according to the invention.
Figure 5:
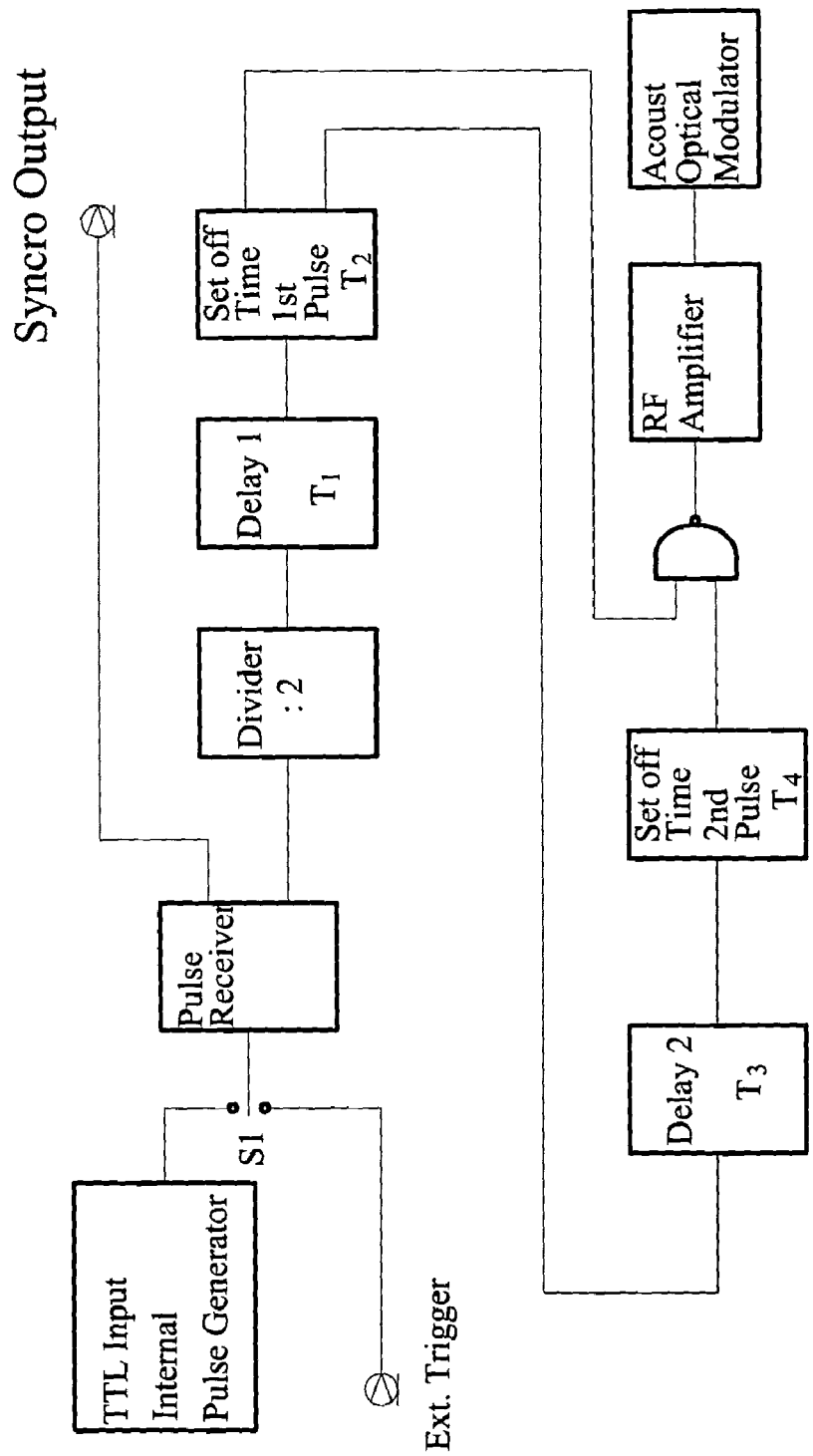
FIG. 5 is a flow chart showing the operation of a controller according to the invention.

Referring now to the figures as shown in FIG. 1 a laser is provided. According to the invention, a laser cavity is provided between mirrors M1 and M3. Mirrors M1 and M3 are reflective preferably highly reflective for fundamental beam. Mirror M3 is also highly reflective for second harmonic beam. Lasing medium LM is provided within the cavity for lasing at a preselected fundamental wavelength. Desirably the lasing medium LM is Nd:YLF, Nd:YAG, Nd:YVO$_4$ or Nd:GdVO$_4$ laser crystal preferably Nd:YLF laser crystal. A diode pump DP is provided in optical communication with mirror M1. A modulator M having an on/off position is provided within the cavity. According to the invention, an acoustooptic or an electrooptic modulator is desirably provided. Preferably an acoustooptic modulator with a controller CT including an electronic control circuit as shown in FIG. 5 or optionally a computer CP as shown in FIG. 4 to control the length of time the modulator is on and off to produce two or more high energy pulses having a short pulse separation is provided.

FIG. 6 shows a control flow chart for implementation by either a electronic control circuit or computer or other suitable controller. Referring to FIG. 6A, a series of trigger signals is provided. FIG. 6B shows RF power is sent to a Q-switched acoustooptic modulator after a delay of T1 from the trigger signal. Referring to FIG. 6B, after the delay T1, RF power is turned off for T2 to release the first pulse. After the period T2, RF power is turned back on for a period T3 to prevent lasing. The modulator is turned on while there is still a population inversion remaining for the second pulse as shown in FIG. 6D. The period T3 is approximately equal to the pulse separation. The RF power is then turned off for a period T4 to allow the release of the second pulse. Referring to FIG. 6C, twin pulses P1 and P2 are produced. As best seen in FIG. 6D, there is still a significant population inversion remaining when the modulator is turned back on after period T2.

Referring again to FIG. 1, a reflecting mirror, preferably a folding mirror M2, which is highly reflective for fundamental beam, is provided in optical communication with modulator M. A dichoric mirror DM which is highly transmissive for fundamental beam and highly reflective for harmonic beam preferably second harmonic beam is provided in optical communication with folding mirror M2 along the optical axis within the optical cavity. A second harmonic generator SHG is provided between dichoric mirror DM and mirror M3 along the optical axis. Desirably, second harmonic generator SHG is a BBO, LBO or KTP nonlinear crystal.

In operation, diode pump DP is energized to supply energy to the lasing medium LM. Mirror M1 is highly transmissive for the pumping wavelength. The diode pump beam is directed through focusing system LS to focus the beam as desired. Electromagnetic radiation propagating from the lasing medium is directed to modulator M. Energy propagating through modulator M is directed to mirror M2 which is highly reflective for fundamental beam and directs fundamental beam to dichoric mirror DM which is highly transmissive for fundamental beam. The modulator M has an on and an off position. In the on position the modulator induces a loss in the cavity to prevent lasing. When the modulator M is in the on position, energy is stored in the lasing medium LM from the pumping source to create a population inversion in the lasing medium in excess of the lasing threshold, that is the amount required for the lasing medium to lase if the modulator was not creating a loss in the cavity. When the modulator M is placed in the off position, the lasing medium LM lases and a laser pulse is produced by laser. Controller CT is provided to turn the modulator from the on position to the off position and vise versa. The controller CT desirably includes an electronic circuit that turns the modulator on and off for preselected periods of time depending on the lasing medium, the pulse energy, pulse separation and number of pulses desired. Optionally, a computer CP as shown in FIG. 4 can be used.

According to the invention, the modulator M is turned on when the pumping source has been activated to create a loss in the cavity. Desirably, the modulator M remains on a sufficient period so that the lasing medium stores enough energy to provide the desired number of pulse and pulse energy. After the lasing medium LM has been pumped and a predetermined population inversion in excess of the lasing threshold has been achieved, controller turns the modulator off for a first predetermined period of time to allow lasing of the laser medium to produce a first pulse. The modulator is then turned on again before the population inversion in the lasing medium is completely depleted preferably before the population inversion falls below the lasing threshold. As a result, the amount of pulse energy in the first pulse is controlled to a predetermined amount. The controller, CT maintains the modulator in the on position for a predetermined period of time corresponding to the desired pulse separation while the laser medium is continuously pumped to increase the amount of energy stored in the lasing medium to achieve a predetermined amount of energy by increasing the population inversion in the lasing medium in excess of the amount remaining when the modulator was turned on in connection with producing the first pulse. The controller CT turns the modulator to the off position for a further predetermined period of time to allow the lasing medium to provide a second pulse having a controlled amount of pulse energy. Desirably, if there is only two pulses required, the modulator M will be turned off until substantially all the energy stored in the lasing medium is expelled in the second pulse. However, according to the invention, the amount of pulse energy in the first and second pulses can be controlled and if desired, the modulator can be turned back on before all the population inversion in the lasing medium has been completely expended. The controller CT turns the modulator M on and off for further periods of time to produce third, fourth, and fifth or more pulses depending on the amount of pulse energy required per pulse, the population inversion remaining in the lasing medium and pulse separation. Preferably the apparatus of the invention produces two or three pulses having a short pulse separation and having about the same pulse energy per pulse desirably twin pulses.

When the modulator is in the off position, the lasing medium lases, the fundamental beam pulse is then directed to second harmonic generator SHG where a portion of the fundamental beam is converted to second harmonic beam. Mirror M3 which is highly reflective for fundamental and second harmonic beam reflects fundamental and second harmonic back through the second harmonic generator where a further portion of the fundamental beam is converted to second harmonic. Second harmonic and fundamental beam propagating from the second harmonic generator are directed to dichoric mirror DM which reflects harmonic beam, preferably second harmonic outside the cavity as the output of the laser. The resulting output is a pulsed second harmonic beam having 2 to 8 pulses having a short pulse separation of 0.5 $\mu s$ to 500 $\mu s$ preferably 0.51 $\mu s$ to 300 $\mu s$. Preferably the output beam has two pulses having about the same pulse energy (twin pulses). When the lasing medium is Nd:YLF lasing at 1053 nm, the pulsed second harmonic beam has a wavelength of about 527 nm. Dichoric mirror DM is highly transmissive for fundamental beam and transmits the fundamental beam to mirror M2 which is highly reflective for fundamental beam and directs the fundamental beam back through modulator M and back through lasing medium LM for amplification.

Desirably, the modulator M is made from a material that is generally transparent, that is transmissive of fundamental beam unless it is subjected to a radio frequency. Desirably, a fused silica or crystal quartz material is used. Such materials are transparent to fundamental wavelength beam when there is no radio frequency applied.

The controller CT is provided in communication with the modulator M. For an acousticoptic modulator, the controller CT controls a transducer to provide a radio wave to modulator M in the on position sufficient to deflect the fundamental beam to prevent lasing for preselected periods of time and turns the modulator off for preselected period of time.

Figure 2:
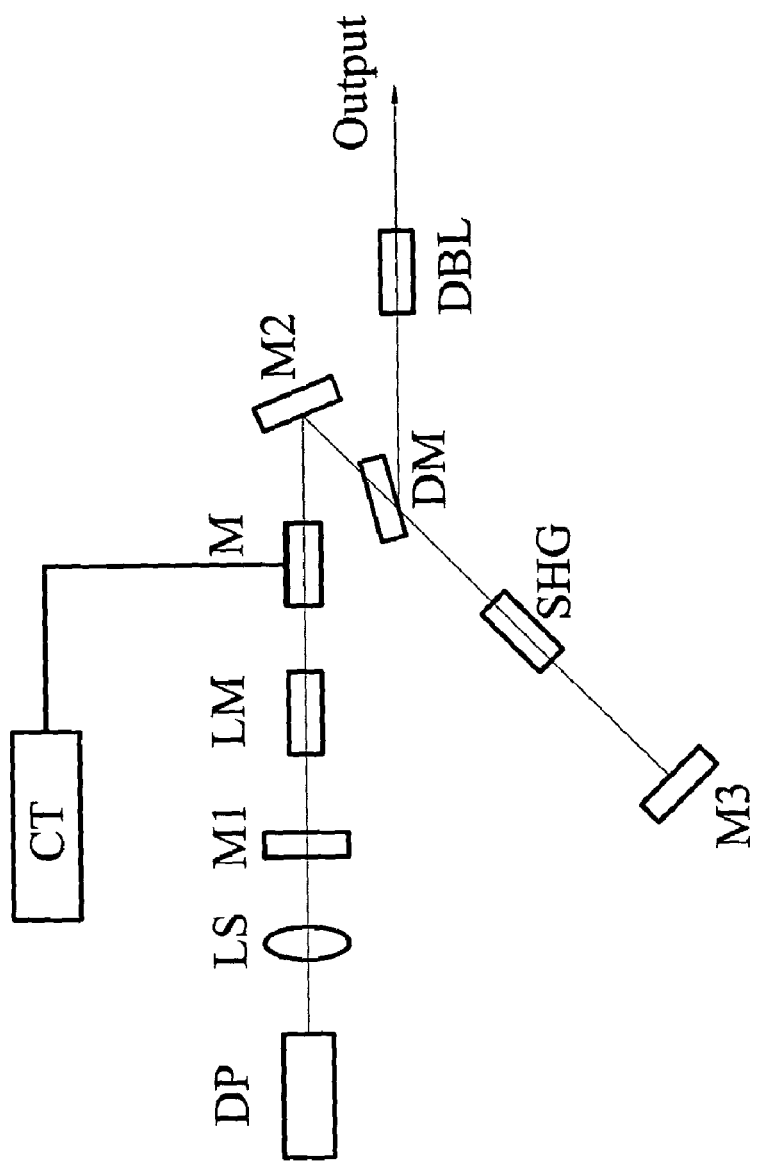
FIG. 2 is a schematic view showing an alternative embodiment of the laser according to the invention.
Figure 3:
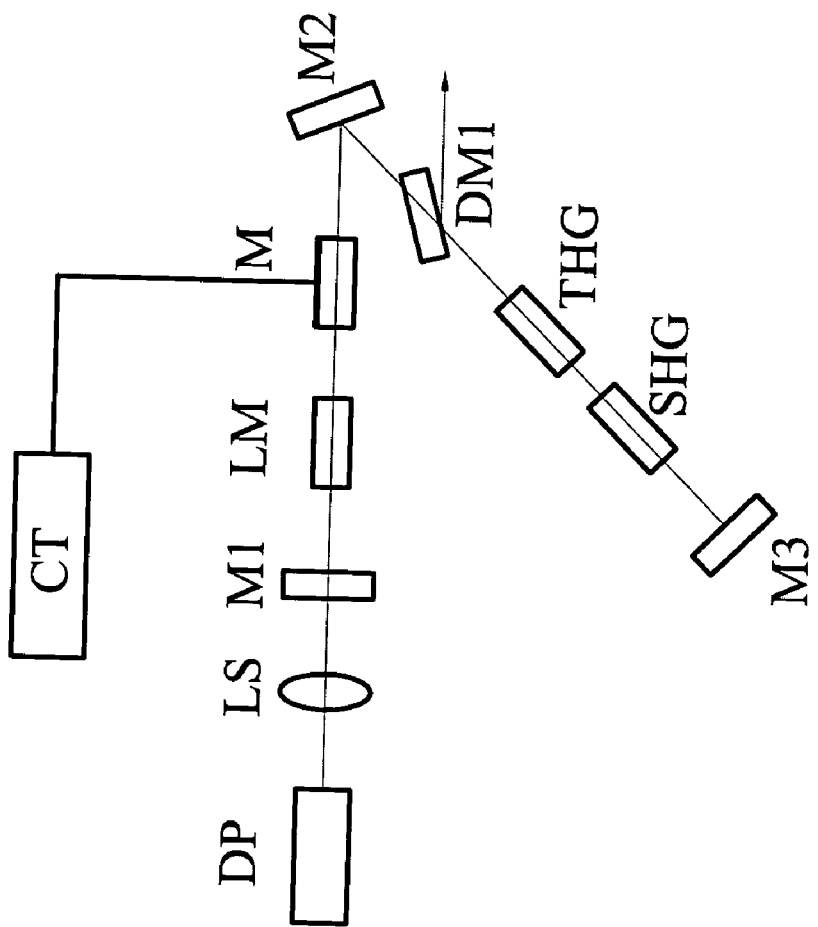
FIG. 3 is a schematic view showing an alternative embodiment of the laser according to the invention.

Referring to FIG. 2 which is similar to FIG. 1 except the pulsed second harmonic output is directed to an external second harmonic generator DBL which doubles the frequency of the second harmonic beam that had been generated intracavity. The resulting output is a pulsed fourth harmonic beam having 2 to 8 pulses preferably twin pulses having a short pulse separation of 0.5 μs to 500 μs preferably 0.5 μs to 300 μs. When the lasing medium is preferably Nd:YLF, a pulsed fourth harmonic beam having a wavelength of about 263 nm is obtained. Referring to FIG. 3 which is similar to FIG. 1 except a third harmonic generator THG (1w+2w=3w) is located within the laser cavity along the optical axis between mirrors M3 and DM1 preferably between mirror DM1 and second harmonic generator SHG for intracavity generation of third harmonic beam. In this embodiment DM1 is highly reflective for third harmonic beam. THG is desirably a BBO or LBO nonlinear crystal. The resulting output is a pulsed third harmonic beam having 2 to 8 pulses preferably twin pulses having a short pulse separation of 0.5 μs to 500 μs preferably 0.5 μs to 300 μs. When the lasing medium is preferably Nd:YLF, a third harmonic beam having a wavelength of about 351 nm is obtained.

Referring to FIG. 4, a laser for providing an OPO output beam is provided. OPO cavities are shown in the art. Intracavitity OPO devices are shown in U.S. Pat. No. 6,108,356 which is incorporated by reference. As shown in FIG. 4, a laser cavity is provided between mirrors M1 and M7. Mirrors M1 and M7 are reflective, preferably highly reflective for fundamental beam in the laser cavity. A laser medium LM, desirably an Nd:YAG, Nd:YLF and Nd:YVO$_4$ crystal is provided within the cavity for lasing at a preselected fundamental wavelength. Desirably, a folding mirror M2 which is highly reflective for fundamental beam is provided within the optical cavity. A diode pump DP is provided to pump laser material LM through mirror M1 which is transmissive preferably highly transmissive to pump wavelength beams. An OPO resonator cavity is provided which desirably partially overlaps with the optical cavity between mirrors M1 and M7. The OPO cavity is provided between mirrors M4 which is highly reflective for signavor idler beam and is located outside the optical laser cavity and mirror M7 which is one of the end mirrors providing the OPO cavity. Mirror M7 is highly reflective of fundamental beam and partially transmissive and partially reflective of signal/or idler wave-length beam. An OPO generator, preferably an OPO nonlinear crystal, for example, a KTP, KTA, RTA, LINBO$_3$ or other OPO nonlinear generator is provided. A dichoric mirror DM2 is provided in optical communication with mirror M2 and with mirrors M7 and M4. Dichoric mirror DM2 is highly reflective of fundamental laser beam and highly transmissive in both directions of either signal/or idler frequency beam. The OPO nonlinear crystal is selected depending on the wavelength of the fundamental beam from the lasing material and the desired longer wavelength output beam. Such crystals include BBO, LBO a KTP, KTA, RTA, KRTA and LINBO$_3$ crystals and the like. The nonlinear OPO crystal provided within the OPO optical cavity is desirably cut for phase matching conditions for fundamental wavelength as the pump source and signal/or idler wavelength. In the embodiment shown in FIG. 4, the fundamental beam wavelength can be for example applied by an Nd:YAG laser crystal having a fundamental wavelength of 1.064 um. A signal wavelength beam of 1.53 um can be for example produced by the OPO nonlinear crystal. A modulator M is provided within the optical cavity. Desirably as shown in FIG. 4, modulator M is provided between laser material LM and folding mirror M2. A controller preferably programmable computer CP is provided in communication with modulator M to turn the modulator on and off for predetermined periods of time as described in detail in connection with FIGS. 1, 5 and 6. Modulator M can be selected from various appropriate modulators, desirably, an acoustooptic modulator or a electrooptic modulator, preferably an acoustooptic modulator.

In operation, the laser material is pumped by a diode DP. The pump beam is focused in lens system LS. Electromagnetic radiation propagating from the laser medium is directed through modulator M. Electromagnetic radiation propagating through M is then directed to mirror M2 where it is reflected to dichoric mirror DM2. When the modulator M is in the on position, energy is stored in the lasing medium LM from the pumping source to create a population inversion in the lasing medium in excess of the lasing threshold, that is the amount required for the lasing medium to lase if the modulator was not creating a loss in the cavity. When the modulator M is placed in the off position, the lasing medium LM lases and a laser pulse is produced by laser. A controller, desirably a computer CP is provided to turn the modulator from the on position to the off position and vise versa. The computer CP is programmed to turn the modulator on and off for preselected periods of time depending on the lasing medium, the pulse energy, pulse separation and number of pulses desired. See FIG. 6 for flow chart.

According to the invention, the modulator M is turned on when the pumping source has been activated to create a loss in the cavity. Desirably, the modulator M remains on a sufficient period so that the lasing medium stores enough energy to provide the desired number of pulses and pulse energy. After the lasing medium LM has been pumped and a predetermined population inversion has been achieved, the Computer CP then turn the modulator off for a first predetermined period of time to allow lasing of the laser medium to produce a first pulse. The modulator is then turned on again before the stored energy is completely depleted preferably before the population inversion falls below the lasing threshold.

As a result, the amount of pulse energy in the first pulse is controlled to a predetermined amount. The controller, desirably computer CP maintains the modulator in the on position for a predetermined period of time corresponding to the desired pulse separation to increase the amount of energy stored in the lasing medium to achieve a predetermined amount of energy by increasing the population inversion in the lasing medium when the modulator was turned on in connection with producing the first pulse. The computer CP turns the modulator to the off position for a further predetermined period of time to allow the lasing medium to provide a second pulse having a controlled amount of pulse energy. Desirably, if there are only two pulses required, the modulator M will be turned off until all the energy stored in the lasing medium is expelled in the second pulse. However, according to the invention, the amount of pulse energy in the first and second pulses can be controlled and if desired, the modulator can be turned back on before all the population inversion in the lasing medium has been completely expended. The controller computer CP turns the modulator M on and off for furthers period of time to produce third, fourth, and fifth or more pulses depending on the amount of pulse energy required per pulse, the population inversion remaining in the lasing medium above the lasing threshold and pulse separation. Preferably the apparatus of the invention produces two or three pulses having a short pulse separation and having about the same pulse energy per pulse desirably twin pulses.

The pulsed fundamental beam is reflected by DM2 through OPO generator, desirably an OPO nonlinear crystal where the output (signal/or idler) beam is generated. Beams propagating from the OPO nonlinear crystal are directed to mirror M7 which is partially transmissive for the desired longer output wavelength beam. Desirably, mirror M7 is about 5% to 50% transmissive and partially reflective for output wavelength beam(signal/or idler) desirably 95% to 50% and highly reflective for fundamental beam. The reflected pulsed fundamental and pulsed output wavelength beam are reflected back through the OPO nonlinear crystal to mirror DM2 where the fundamental beam is reflected back to mirror M2 which reflects it back through the laser medium LM for amplification. The pulsed output beam is transmitted by dichoric mirror DM2 and directed to mirror M4 which reflects the output beam back to dichoric mirror DM2 which transmits the output wavelength beam back through the OPO nonlinear crystal. The resulting output is a pulsed OPO beam having 2 to 5 pulses preferably twin pulses having a short pulse separation of 0.5 $\mu$s to 500 $\mu$s preferably 0.5 $\mu$s to 300 $\mu$s.

EXAMPLES

Example 1

Figure 7:
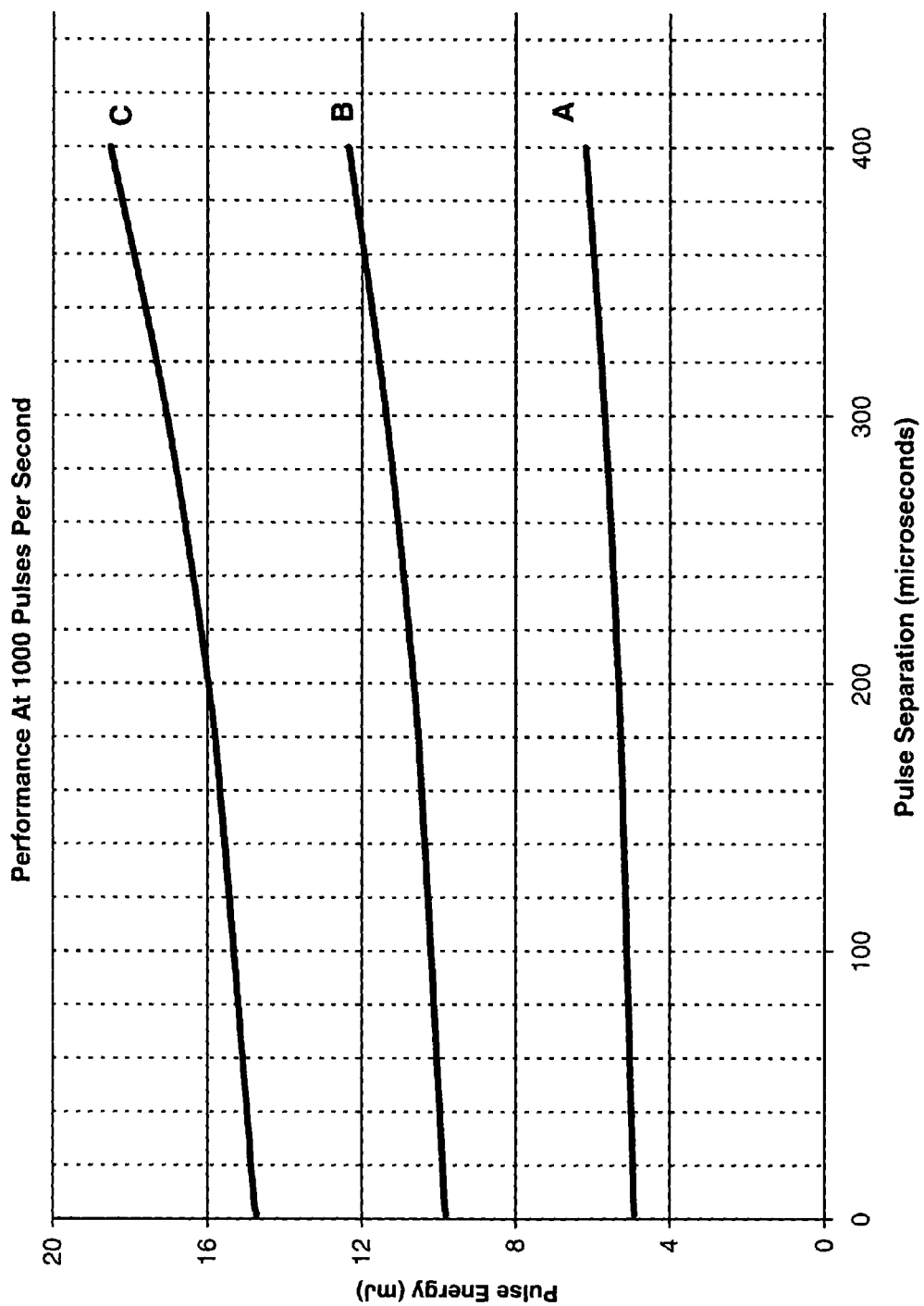
FIG. 7 is a graph showing the pulse energy as a function of pulse separation for three different Nd:YLF lasers.

FIG. 7 is a graph of experimental data for three Nd:YLF second harmonic lasers according to the invention. Laser cavities were set up and continuously pumped. Laser A has a single pulse energy of about 10 mj, laser B of about 20 mj, and laser C of about 30 mj at a repetition rate of 1000 pulses per record. The graph of FIG. 7 represent the energy per pulse for twin pulses as a function of pulse separation when operated a 500 HZ.

A laser application requires the following:

Dual pulses at repetition at 500 dual pulses per second at a wavelength of about 527 nm.

$1^{st}$ pulse energy: 5 mj $2^{nd}$ pulse energy: 5 mj

Pulse separation between the first pulse to second pulse: 10 $\mu$s

Since the desired pulse to pulse separation is 10 $\mu$s, conventionally Q-switched Nd:YLF lasers do not work properly at this short separation since this separation is much shorter than typical recovery time for Q-switched Nd:YLF laser of about 100 $\mu$s. Thus a conventionally Q-switched laser would not provide the desired short pulse separation.

Nd:YLF laser normally produces about 10 mJ/pulse at 1000 pulse/second. The required pulse to pulse separation is about 10 $\mu$s. The Q-switch is turned on for about 2 ms to pump the laser. It is known from experimentally running the laser that it takes about 1 to 3 $\mu$s of Q-switch off time to form and deliver the energy stored as a single pulse. It has been found experimentally that is about 50% of the total energy is sought in the first pulse, the Q-switch should be turned off for about 0.2 $\mu$s (to release approximately 50% of the energy stored to form the first pulse) to release the first pulse with approximately 50% of the total stored energy. The balance is withheld (Q-switch is turned on). The laser medium is continuously pumped. After the Q-switch turned on for about 10 $\mu$s which corresponding to the pulse separation required, the Q-switch is turned off again for about 1 to 3 $\mu$s to form the second pulse to release the energy stored in the laser medium. The off time can be reduced to withhold some energy stored in the laser medium for optional third pulse. One can fine tune the off time of the Q-switch to achieve exactly 5/5 pulse energy ratio by varying first off time and measuring the pulse energy of the first and second pulses.

As can be seen from FIG. 7, pulse energies can be easily ascertained. Thus, for example using the lasers A, B and C at a pulse separation of for example 200 s laser. A produced twin pulses having about 5 mj laser B of about 11 mj and laser C of about 16 mj. Lower pulse energy can be provided from laser A, B and C by lowering the pumping intensity.

The foregoing is considered as illustrative only to the principles of the invention. Further, since numerous changes and modification will occur to those skilled in the art, it is not desired to limit the invention to the exact construction and operation shown and described above, and accordingly all suitable modifications and equivalents may be resorted to, falling within the scope of the invention.

What is claimed is:

1. A multiple pulse single head laser comprising:
   a) a laser cavity;
   b) a lasing medium having a population inversion threshold for lasing located within said cavity;
   c) a modulator having an on and an off position located within said cavity in optical communication with said lasing medium;
   d) a pumping source in optical communication with said lasing medium to provide electromagnetic radiation (EMR) to said lasing medium;
   e) said modulator in said on position inducing a loss in said cavity sufficient to prevent lasing;
   f) said lasing medium storing energy from said pumping source to create a population inversion in said lasing medium in excess of the lasing threshold of said lasing medium when said modulator is in said on position;
   g) said modulator in said off position allowing lasing to occur in said cavity;
   h) a controller in communication with said modulator to turn said modulator from said on position to said off position and vise versa; said controller
   i) turning said modulator to said on position for a first period of time to store a first predetermined amount of energy in said lasing medium by creating a population inversion in said lasing medium in excess of the lasing threshold of said lasing medium;
      ii) turning said modulator to said off position for a second predetermined period of time to allow lasing of said lasing medium to produce a first pulse;
      iii) turning said modulator on before said population inversion in said lasing medium is completely depleted so that a second predetermined amount of energy remains stored in said lasing medium; said first pulse containing a first controlled amount of pulse energy;
      iv) maintaining said modulator in said on position for a second predetermined period of time approximately equal to a preselected pulse separation;
      v) turning said modulator to said off position for a third predetermined period of time to allow lasing of said lasing medium to provide a second pulse having a second controlled amount of pulse energy.

2. The multiple pulse single head laser according to claim 1 comprising said lasing medium having a fluorescent lifetime; said first and said second pulses having a time separation of less than 2 times the fluorescent lifetime of said lasing medium.

3. The multiple pulse single head laser according to claim 1 comprising said lasing medium having a fluorescent lifetime; said first and said second pulses having a time separation of less than the fluorescent lifetime of said lasing medium.

4. The multiple pulse single head laser according to claim 1 comprising said lasing medium having a fluorescent lifetime; said first and said second pulses having a time separation of 10% or less the fluorescent lifetime of said lasing medium.

5. The multiple pulse single head laser according to claim 1 wherein said first pulse and said second pulse have about the same amount of pulse energy.

6. The multiple pulse single head laser according to claim 1 further comprising said controller
   vi) turning said modulator on before said population inversion in said lasing medium is completely depleted so that a fourth predetermined amount of energy remains stored in said lasing medium; said second pulse containing a second controlled amount of pulse energy;
   vii) maintaining said modulator in said on position for a fourth predetermined period of time, said fourth predetermined period of time approximately equal to a preselected pulse separation;
   viii) turning said modulator to said off position for a fifth predetermined period of time to allow lasing of said lasing medium to provide a third pulse having a third controlled amount of pulse energy.

7. The multiple pulse single head laser according to claim 6 wherein in iii) and vi) said modulator is turned on before the population inversion falls below the lasing threshold.

8. The multiple pulse single head laser according to claim 1 further comprising said pulses have about the same amount of pulse energy.

9. The multiple pulse single head laser according to claim 1 further comprising said laser has a repetition rate of 1 to 10 kHz.

10. The multiple pulse single head laser according to claim 1 wherein said lasing medium is an Nd:YAG lasing crystal.

11. The multiple pulse single head laser according to claim 1 wherein said lasing medium is an Nd:YLF crystal and said modulator is turned on in iii) before said population inversion in said lasing medium reaches said lasing threshold.

12. The multiple pulse single head laser according to claim 11 wherein said first and said second pulses have a pulse separation of from 0.5 $\mu$s to 500 $\mu$s.

13. The multiple pulse single head laser according to claim 12 wherein said first and second pulse have a pulse energy of 1 mj to 40 mj.

14. The multiple pulse single head laser according to claim 12 wherein said first pulse and said second pulse have a pulse energy of 3 mj to 25 mj.

15. The multiple pulse single head laser according to claim 12 further comprising said first pulse and said second pulse have about the same pulse energy.

16. The multiple pulse single head laser according to claim 12 further comprising said controller
   vi) turning said modulator on before said population inversion in said lasing medium reaches said lasing threshold so that a fourth predetermined amount of energy remains stored in said lasing medium; said second pulse containing a second controlled amount of pulse energy;
   vii) maintaining said modulator in said on position for a fourth predetermined period of time, said fourth predetermined period of time approximately equal to a preselected pulse separation;
   viii) turning said modulator to said off position for a fifth predetermined period of time to allow lasing of said lasing medium to provide a third pulse having a third controlled amount of pulse energy.

17. The multiple pulse single head laser according to claim 12 further comprising said first pulse, said second pulse and said third pulse have about the same pulse energy.

18. The multiple pulse single head laser according to claim 17 wherein said first, said second and said third pulses have a pulse separation of from 0.5 $\mu$s to 500 $\mu$s.

19. The multiple pulse single head laser according to claim 18 wherein said first, said second and said third pulses have a pulse separation of from 1 $\mu$s to 200 $\mu$s.

20. The multiple pulse single head laser according to claim 12 wherein said controller includes a microprocessor controller.

21. The multiple pulse single head laser according to claim 11 wherein said first and said second pulses have a pulse separation of from 1 $\mu$s to 200 $\mu$s.

22. The multiple pulse single head laser according to claim 1 wherein in iii) said modulator is turned on before the population inversion falls below the lasing threshold.

23. The multiple pulse single head laser according to claim 1 wherein said pumping source is a continuous pumping source, the amount of energy in said lasing medium increasing to a third predetermined amount of energy by increasing the population inversion in said lasing medium in excess of the population inversion of iii).

24. The multiple pulse single head laser according to claim 1 wherein said modulator is turned on and off multiple times to produce four(4) or more pulses.

25. The multiple pulse single head laser according to claim 1 wherein said modulator is turned on and off multiple times to produce four(4) to eight(8) pulses.

26. The multiple pulse single head laser according to claim 1 wherein said laser is a harmonic laser.

27. The multiple pulse single head laser according to claim 1 wherein said laser is intracavity harmonic laser.

28. The multiple pulse single head laser according to claim 27 wherein said laser is a second harmonic laser.

29. The multiple pulse single head laser according to claim 27 wherein said laser is a third harmonic laser.

30. The multiple pulse single head laser according to claim 1 further comprising an OPO generator for producing an output beam having a preselected frequency.

31. A method of providing multiple laser pulses from a single laser:
   a) forming a laser cavity; said laser cavity including
      i) a lasing medium having a population inversion threshold for lasing and;
      ii) a modulator having an on and an off position;
   b) pumping said lasing medium to provide electromagnetic radiation(EMR) to said lasing medium;
   c) turning said modulator on to induce a loss in said cavity sufficient to prevent lasing;
   d) storing a first predetermined amount of energy in said lasing medium when said modulator is turned on by creating a population inversion in said lasing medium in excess of the lasing threshold of said lasing medium;
   e) turning said modulator off for a first predetermined period of time to allow lasing of said lasing medium to provide a first pulse;
   f) turning said modulator on before said population inversion in said lasing medium is completely depleted so that a second predetermined amount of energy remains stored in said lasing medium; said first pulse containing a first controlled amount of pulse energy;
   g) said modulator inducing a loss in said cavity sufficient to prevent lasing;

h) maintaining said modulator in said on position for a second predetermined period of time approximately equal to a preselected pulse separation;

i) turning said modulator off for a third predetermined period of time to allow lasing of said lasing medium to provide a second pulse having a second controlled amount of pulse energy.

32. The method of providing multiple laser pulses from a single laser according to claim 31 further comprising said lasing medium having a fluorescent lifetime; said first and said second pulses having a time separation of less than 2 times the fluorescent lifetime of said lasing medium.

33. The method of providing multiple laser pulses from a single laser according to claim 31 further comprising said lasing medium having a fluorescent lifetime; said first and said second pulses having a time separation of less than 1 time the fluorescent lifetime of said lasing medium.

34. The method of providing multiple laser pulses from a single laser according to claim 31 further comprising said lasing medium having a fluorescent lifetime; said first and said second pulses having a time separation of 10% or less the fluorescent lifetime of said lasing medium.

35. The method of providing multiple laser pulses from a single laser according to claim 31 wherein said first pulse and said second pulse have about the same amount of pulse energy.

36. The method of providing multiple laser pulses from a single laser according to claim 31 further comprising:

j) turning said modulator on before said population inversion in said lasing medium is completely depleted so that a fourth predetermined amount of energy remains stored in said lasing medium; said second pulse containing a second controlled amount of pulse energy;

k) maintaining said modulator in said on position for a fourth predetermined period of time, said fourth predetermined period of time approximately equal to a preselected pulse separation;

l) turning said modulator to said off position for a fifth predetermined period of time to allow lasing of said lasing medium to provide a third pulse having a third controlled amount of pulse energy.

37. The method of providing multiple laser pulses from a single laser according to claim 36 wherein in f) and j) said modulator is turned on before the population inversion falls below the lasing threshold.

38. The method of providing multiple laser pulses from a single laser according to claim 31 further comprising said pulses have about the same amount of pulse energy.

39. The method of providing multiple laser pulses from a single laser according to claim 31 further comprising said laser has a repetition rate of 500 to 5000 kHZ.

40. The method of providing multiple laser pulses from a single laser according to claim 31 wherein said lasing medium is an Nd:YAG lasing crystal.

41. The method of providing multiple laser pulses from a single laser according to claim 31 wherein said lasing medium is an Nd:YLF lasing crystal and said modulator is turned on in f) before said population inversion in said lasing medium reaches said lasing threshold.

42. The method of providing multiple laser pulses from a single laser according to claim 41 wherein said first and said second pulses have a pulse separation of from 0.5 $\mu$s to 500 $\mu$s.

43. The method of providing multiple laser pulses from a single laser according to claim 42 wherein said first and second pulse have a pulse energy of 1 mj to 40 mj.

44. The method of providing multiple laser pulses from a single laser according to claim 42 wherein said first pulse and said second pulse have apulse energy of 3 mj to 25 mj.

45. The multiple pulse single head laser according to claim 42 further comprising said first pulse and said second pulse have about the same pulse energy.

46. The multiple pulse single head laser according to claim 42 further comprising:

j) turning said modulator on before said population inversion in said lasing medium reaches said lasing threshold so that a fourth predetermined amount of energy remains stored in said lasing medium; said second pulse containing a second controlled amount of pulse energy;

k) maintaining said modulator in said on position for a fourth predetermined period of time, said fourth predetermined period of time approximately equal to a preselected pulse separation;

l) turning said modulator to said off position for a fifth predetermined period of time to allow lasing of said lasing medium to provide a third pulse having a third controlled amount of pulse energy.

47. The method of providing multiple laser pulses from a single laser according to claim 46 wherein said first, said second and said third pulses have a pulse separation of from 0.5 $\mu$s to 500 $\mu$s.

48. The method of providing multiple laser pulses from a single laser according to claim 47 wherein said first, said second and said third pulses have a pulse separation of from 1 $\mu$s to 200 $\mu$s.

49. The method of providing multiple laser pulses from a single laser according to claim 42 further comprising said first pulse, said second pulse and said third pulse have about the same pulse energy.

50. The method of providing multiple laser pulses from a single laser according to claim 41 wherein said first and said second pulses have a pulse separation of from 1 $\mu$s to 200 $\mu$s.

51. The method of providing multiple laser pulses from a single laser according to claim 31 wherein in f) said modulator is turned on before the population inversion falls below the lasing threshold.

52. The method of providing multiple laser pulses from a single laser according to claim 31 wherein said pumping source is a continuous pumping source, the amount of energy in said lasing medium increasing to a third predetermined amount of energy by increasing the population inversion in said lasing medium in excess of the population inversion of iii).

53. The method of providing multiple laser pulses from a single laser according to claim 31 wherein said modulator is turned on and off multiple times to produce four(4) or more pulses.

54. The method of providing multiple laser pulses from a single laser according to claim 31 wherein said modulator is turned on and off multiple times to produce four(4) to eight(8) pulses.

* * * * *